Figure 1:
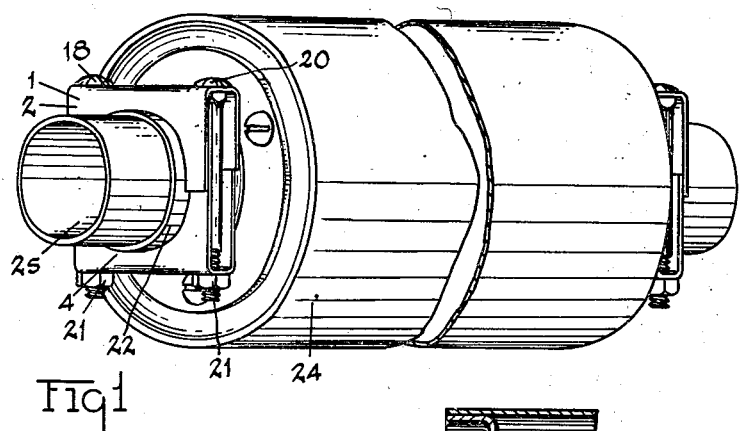

Jan. 25, 1938.  J. J. COMPO  2,106,628
MUFFLER CLAMP
Filed Feb. 27, 1937  2 Sheets-Sheet 1

Inventor
John J. Compo

Jan. 25, 1938. J. J. COMPO 2,106,628
MUFFLER CLAMP
Filed Feb. 27, 1937 2 Sheets-Sheet 2

Inventor
John J. Compo
By *Faust F. Crampton*
Attorney

Patented Jan. 25, 1938

2,106,628

UNITED STATES PATENT OFFICE 2,106,628

MUFFLER CLAMP

John J. Compo, Defiance, Ohio

Application February 27, 1937, Serial No. 128,154

4 Claims. (Cl. 285—183)

My invention has for its object to produce an efficient clamp for connecting a muffler with the exhaust pipe of an internal combustion engine and the tail pipe of the muffler and for preventing escape of exhaust gases at the points of connection of the pipes with the muffler.

As is well known in connection with mufflers, it has been difficult to produce durable gas-tight connections between the parts through which the exhaust gases of internal combustion engines are discharged. The constant pulsation of the pressures of the exhaust gas produces an intense vibration of the parts which often causes loosening of the parts and eventually produces leakage. Also, where mufflers are installed in automobiles and trucks, the vibration and jarring produced by the travel of the conveyances over the road causes loosening and escape of exhaust gases often to the injury of those operating the conveyances.

Heretofore, connectors of different forms have been used for connecting the sleeves or necks of mufflers to the inlet and outlet pipes through which the exhaust gases are discharged from the engine. The connectors have been provided with various forms of devices for clamping the cylindrical parts in an effort to produce and maintain a gas-tight connection, but in the application of such devices, the outer of the clamped cylindrical parts is forced into an elliptical form that invariably produces openings between the parts at the ends of the longer diameter through which the exhaust gases escape. Such clamping devices do not produce radially directed pressures throughout the area of engagement of the clamping devices. By my invention, I have provided a means for producing substantially uniform, radially directed, complete circular line pressure between the contacting parts for sealing the connections of the pipes to the sleeves or necks of the mufflers.

The invention particularly provides a pair of clamping members having semi-circular edge parts and means for drawing the clamping members about a sleeve of the muffler and a connecting pipe to produce a high radially directed line pressure throughout the entire circle of the contact between the sleeve and the pipe and prevent deflection of portions of the outer of the tubular parts at the ends of the clamping members from the inner of the tubular parts.

The invention particularly provides a pair of clamping members having projecting semi-circular edge parts and means for drawing the clamping members about the sleeve of the muffler and the pipe and flexing the clamping members to produce an inward pressure of the projecting parts at their ends, as well as along their central portions and thereby produce substantially uniform radial pressure with respect to the centers of the sleeve and the pipe throughout the length of the projecting parts.

Connectors containing the invention may partake of different forms and may be varied in their details and still embody the invention. To illustrate a practical application of the invention, I have selected a connector embodying the invention as an example of various structures that contain the invention and shall describe the selected connector hereinafter. The particular connector selected is shown in the accompanying drawings.

Figure 2:
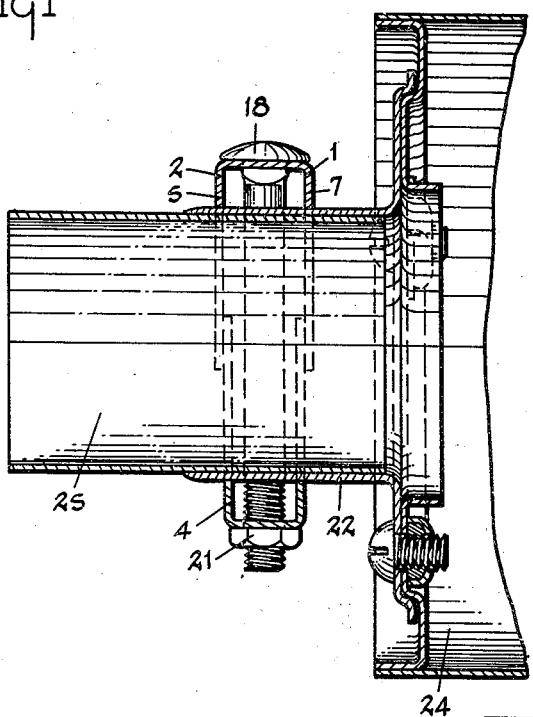
Figure 3:
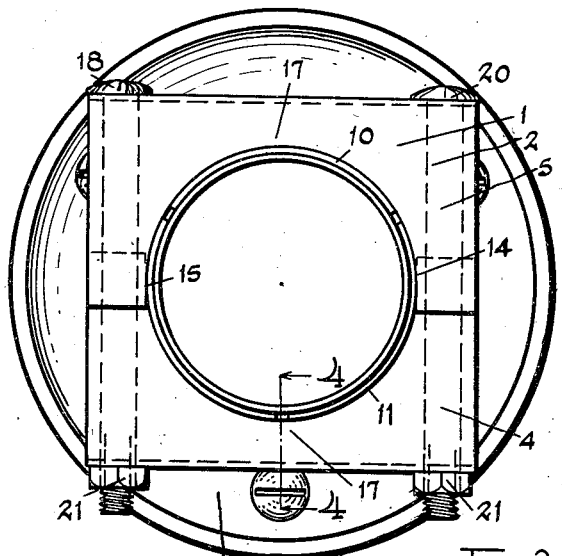
Figure 4:
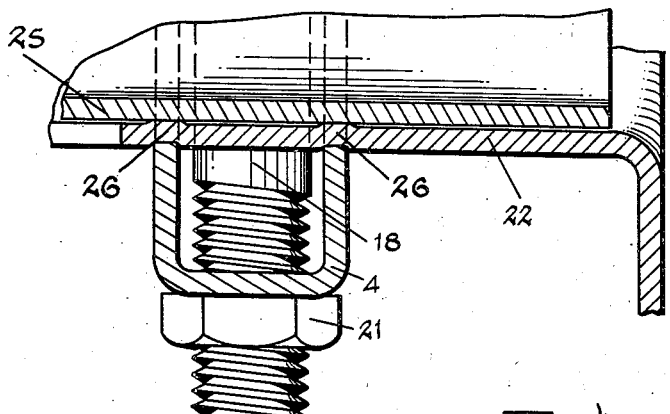

Fig. 1 illustrates a perspective view of a muffler showing one of the connectors. Fig. 2 illustrates a section of the end of the muffler and the end of a pipe that is connected thereto. Fig. 3 illustrates an end view of the connector and the muffler. Fig. 4 illustrates an enlarged sectional view of one of the clamping members taken on the plane of the line 4—4 indicated in Fig. 3.

In the form of construction illustrated in the drawings, the clamp 1 comprises a pair of clamping members 2 and 4, preferably formed of relatively heavy sheet metal and bent U-shape to form flange parts 5 and 7. Each of the flange parts 5 and 7 is provided with semi-circular edge portions 10 and 11 and also substantially right line edge portions 14 and 15. The edges of the portions 14 and 15 extend tangentially from the ends of the semi-circular edges of the portions 10 and 11. The edge portions 14 and 15 overlap corresponding edge portions 14 and 15 of the other of the clamping members. Preferably, the outer surfaces of the overlapping portions of one of the clamping members form a sliding fit with and are located intermediate the corresponding portions of the other member. The clamping members have dimensions such that the semi-circular edge portions narrow the central parts 17 of the clamping members to render them flexible so that when the ends of the clamping members are subjected to a considerable pressure, the central parts flex and cause the ends of the semi-circular edge portions and the right line edge portions at the ends of the clamping members to be pressed inward toward the centers of the pipe and the sleeve.

Relatively large bolts 18 and 20 extend through the ends of the clamping members and between the flange parts 5 and 7. Nuts 21 are located on the bolts for drawing the clamping members toward each other. The clamp is placed about the sleeve 22 of the muffler. The connecting pipe 25, such as the exhaust pipe of the engine or the tail pipe of the muffler, is inserted in the sleeve 22. When the nuts 21 are rotated they operate to tightly draw the semi-circular edge portions of the flanges 5 and 7 against the metal of the sleeve 22 and to depress the metal along the edges of the flanges and force it into contact with the metal of the pipe 25, substantially as illustrated in Fig. 4, which is a magnified view of a part of the structure. The nuts may be turned to produce a pressure sufficiently great to produce a ridge or bead 26 in the sleeve that tightly engages the surface of the pipe along two circular lines.

When the clamping members are thus tightly drawn by the bolts 18 and 20 and the nuts 21, the clamping members flex at their central portions 17 to force the overlapping end portions along the tangentially extending edges of the clamping members against the metal of the sleeve to tightly press the metal of the sleeve against the pipe and prevent opening or separation of the metal of the sleeve from the metal of the pipe at the ends of the clamping members that ordinarily tend to curve elliptically where two circular clamping parts are drawn or pressed toward each other about a cylindrical sheet metal member.

I claim:

1. In a muffler pipe clamp for connecting the muffler to a pipe through which exhaust gases are conducted, a pair of clamping members having concave semi-circular inwardly protruding edge parts and end portions that extend tangentially to the semi-circular edge parts, and means for engaging end portions of the clamping members to clamp the members about the pipe and sleeve of the muffler and centrally flex the clamping members to force the overlapping protruding tangential end edge portions of the protruding parts against the outer of the clamped parts.

2. In a muffler pipe clamp for connecting a pipe to the sleeve of the muffler, a pair of sheet metal clamping members bent U-shape to form flange parts, each of the flange parts having concave semi-circular edge portions and right line portions extending tangentially to the ends of the semi-circular edge portions, and means for engaging the end portions of the clamping member intermediate the flange parts to clamp the edges of the flange parts about the pipe and the sleeve of the muffler and centrally flex the clamping members to depress the metal engaged by the edges of the flange parts and produce radially directed pressure toward the centers of the clamping parts.

3. In a metal clamp, a pair of metal clamping members having concave circular inwardly protruding ridges and a flexible part located intermediate the ends of the ridges, and means for engaging end portions of the clamping member to draw the end portions toward each other subsequent to engagement of the central portions of the ridges with the outer surface of the object clamped by the clamping members and flex the said central flexible part to move the end parts of the ridges in directions toward each other and substantially at right angles to the direction in which the end portions of the clamping members are drawn toward each other.

4. In a clamp for clamping pipes and the like, a pair of clamping members having concave semi-circular protruding edge parts and end portions that extend tangentially to the semi-circular portions, and means for engaging end portions of the clamping members to draw the end portions of one of the members toward the end portions of the other of the members and to clamp the members about the pipe and centrally flex the clamping member to force the tangential end portions of the protruding parts inwardly against the pipe in a direction substantially at right angles to the direction in which the end portions of the clamping members are drawn toward each other.

JOHN J. COMPO.